United States Patent [19]

Ulrich et al.

[11] Patent Number: 4,601,496
[45] Date of Patent: Jul. 22, 1986

[54] FIBER REINFORCED PLASTIC PIPE TEE

[75] Inventors: Ronald G. Ulrich, Burbank; Ralph S. Friedrich, Hermosa Beach, both of Calif.

[73] Assignee: Ameron, Inc., Monterey Park, Calif.

[21] Appl. No.: 186,335

[22] Filed: Sep. 11, 1980

[51] Int. Cl.[4] .................... F16L 41/00; F16L 47/00
[52] U.S. Cl. .................... 285/156; 156/173; 285/423
[58] Field of Search ............. 285/156, 423, DIG. 20; 156/173

[56] References Cited

U.S. PATENT DOCUMENTS

| 2,751,237 | 6/1956 | Conley | 285/156 |
| 2,878,038 | 3/1959 | Noland | 285/156 X |
| 3,522,122 | 7/1970 | De Ganahl | 156/173 X |
| 3,765,979 | 10/1973 | Thomas | 285/156 X |
| 3,963,185 | 6/1976 | Quirk | 285/156 X |
| 4,106,797 | 8/1978 | Michael | 285/423 X |

FOREIGN PATENT DOCUMENTS 1150700 8/1957 France .

OTHER PUBLICATIONS

"GRP-Pipe Fittings Produced on a Computer Controlled Filament Winding Machine", by E. A. Hille and G. Menges, Pre-Print from 35th Annual Conference, Reinforced Plastics/Composites Institute of The Society of the Plastics Industry, Inc., published on or about 2/4–2/8/80.
Knytex Weft Unidirectional Fabrics, Axial Reinforcement for Pipe and Tank Applications, Product Information, KNYTEX.

Primary Examiner—Thomas F. Callaghan
Attorney, Agent, or Firm—Christie, Parker & Hale

[57] ABSTRACT

A fiber reinforced plastic pipe tee is formed by winding glass rovings around a mandrel in a plurality of wrap patterns which collectively cover the pipe tee. A tape having synthetic fiber warp and glass roving weft is included in wrapping of the pipe tee. Such glass reinforcing fibers are oriented in the tee for resisting biaxial stresses. A bulge is provided on each side of the pipe tee in the diaphragm area for resisting biaxial stresses without introducing problems in winding the pipe tee.

53 Claims, 15 Drawing Figures

PATTERN (a) Fig. 3
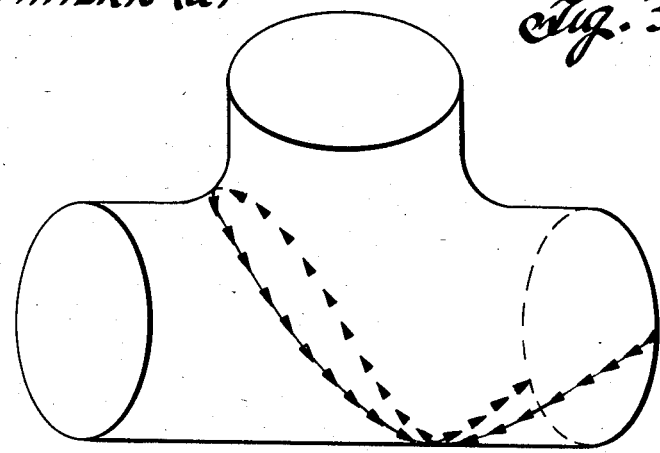
PATTERN (b) Fig. 4
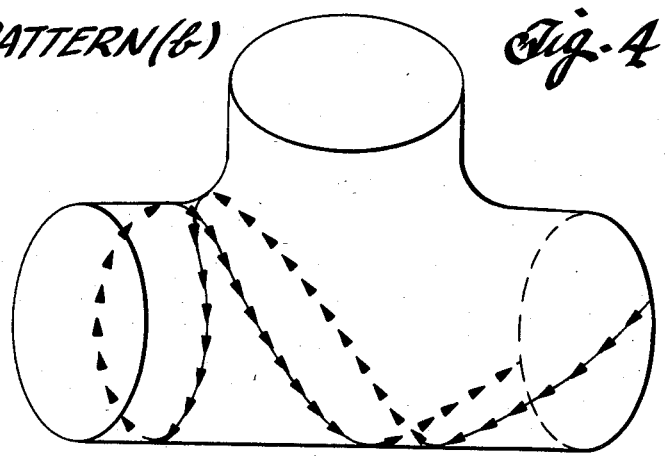

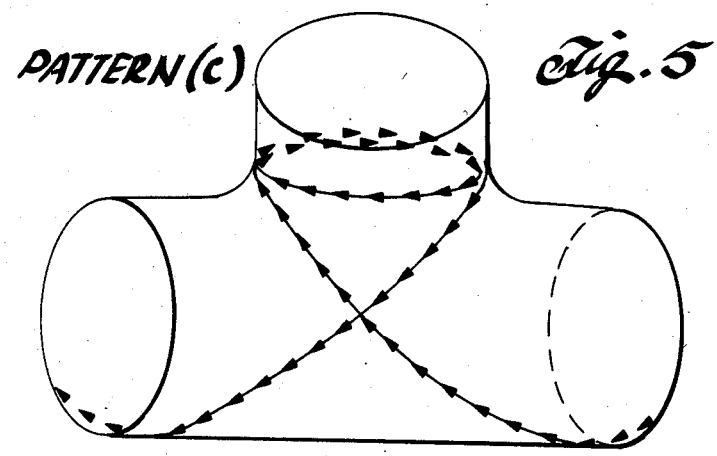
PATTERN (c) Fig. 5
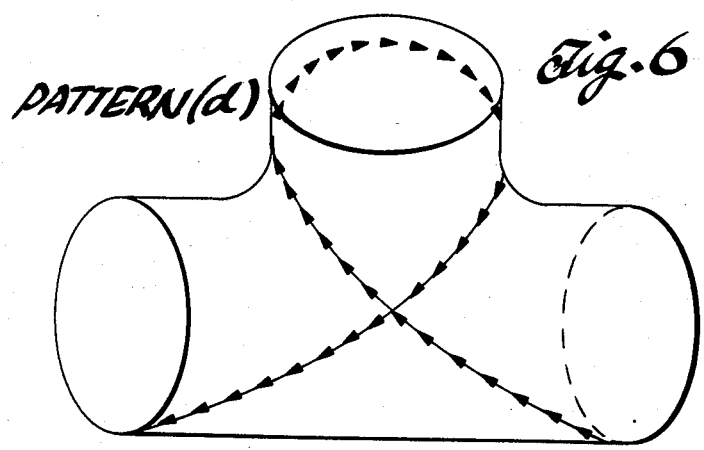
PATTERN (d) Fig. 6

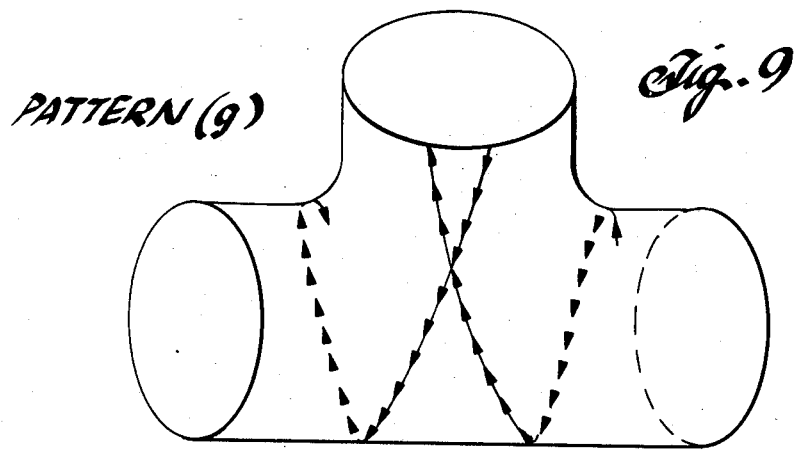
PATTERN (g)  Fig. 9
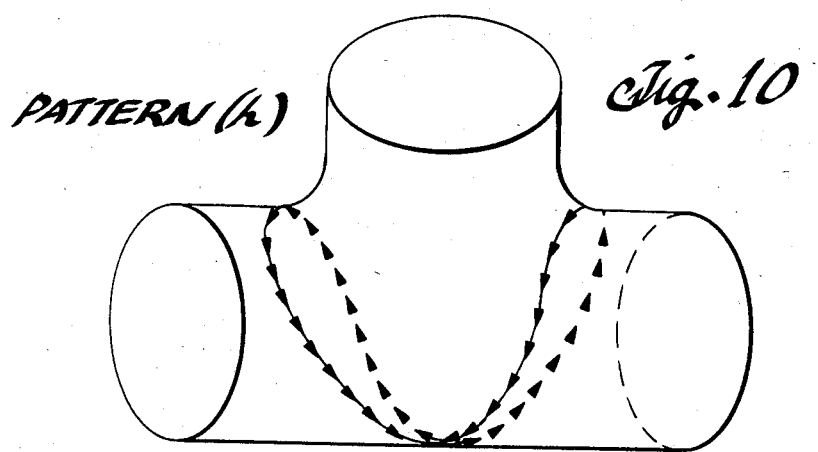
PATTERN (h)  Fig. 10

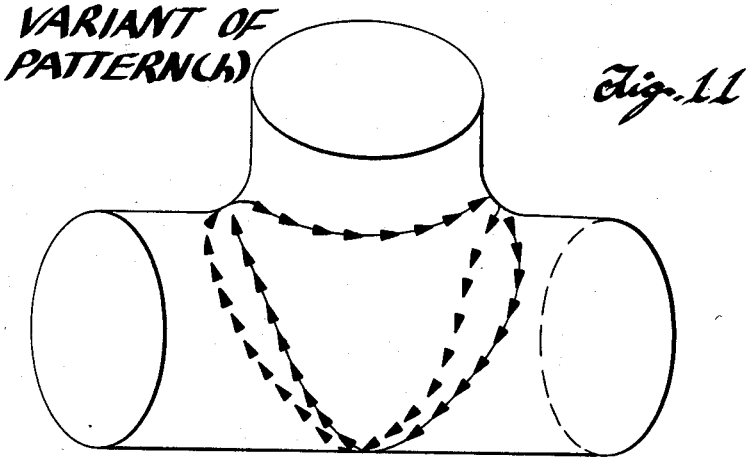
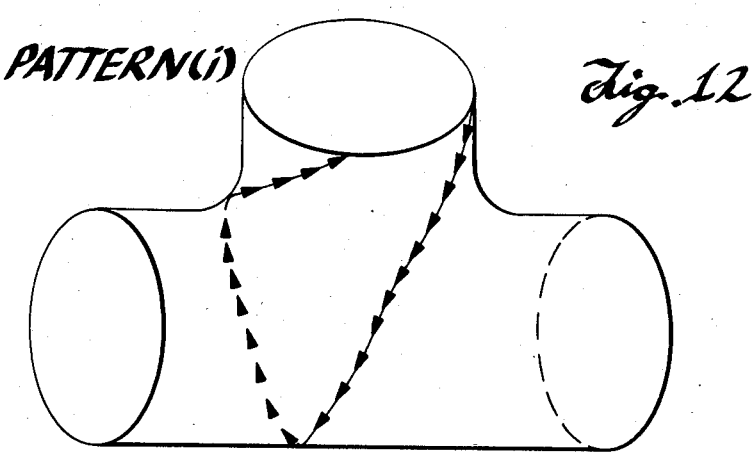
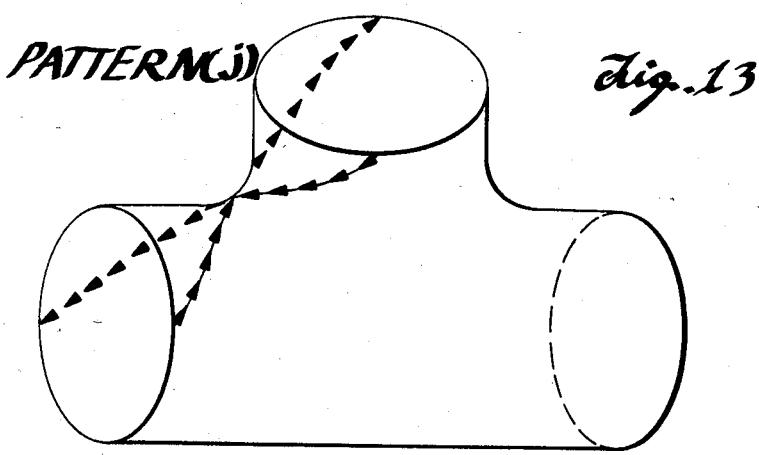

FIBER REINFORCED PLASTIC PIPE TEE

FIELD OF INVENTION

This invention relates to fiber reinforced plastic pipe tees, such as, for example, a glass fiber reinforced epoxy resin tee. A tee geometry and winding patterns are disclosed.

BACKGROUND

Fiber reinforced plastic pipe has come into reasonably extensive use in recent years for handling corrosive materials, petrochemicals, and the like where metallic pipe is unsuitable. Glass fiber reinforcements are employed so that pipe can withstand appreciable pressures. Epoxy resins, commonly with a thin lining resistant to chemicals are often used. The pipes are formed by winding rovings of glass fiber coated with epoxy resin in helical paths around a cylindrical mandrel and curing the resin. Such pipes can be made economically and it is desirable to make economical fittings for such pipes, such as tees and elbows.

Techniques have been developed for economically winding pipe elbows which are essentially sharply curved sections of pipe having two ends. Economical techniques have not been developed for winding pipe tees since they have a much more complicated geometry. Unlike an elbow with two ends, a pipe tee has three ends. This greatly complicates the winding problems since it is important to cover all areas of the tee with a sufficient thickness of fibers with proper orientation for resisting the complex stress distributions in a tee without excess thickness being built up in other areas.

The patterns used for winding the tee must keep the rovings in contact with or very close to the mandrel on which the tee is wound for maintaining a desired internal geometry in the tee. "Bridging" of fibers across a concave portion of the tee can result in very low strength in the bridged areas and require excessive quantities of reinforcement for resisting operating pressures. Commercially available tees are made by hand by laying up a montage of strips of woven fabric. Such assembly techniques are costly since the woven glass fabric is expensive and a large amount of hand labor is required. Quality control with such assembly procedures is also difficult and costly.

There is, therefore, a substantial need for an economical technique for winding fiber reinforced plastic pipe tees, preferably using relatively inexpensive glass roving instead of costly woven fabric. Such a technique must cover all areas of the tee with an adequate thickness of material to resist the complex stress distribution in a pipe tee without excessive waste or thickness in some areas of the tee.

One area of particular concern because of poor stress distribution is known as the diaphragm and comprises a roughly triangular area on each side of the tee near where the three arms of the tee intersect. This area tends to be relatively flat and subject to biaxial stresses which are large and hard to resist in a non-ductile material such as fiber reinforced plastic.

A variety of configurations have been proposed or used for metal tees, or valve bodies which can be considered to be tees with internal flow control mechanisms. The configuration of the body of a valve is commonly dictated by the internal structure rather than controlled by the stress distribution. The configuration of metal tees and valves is not apropos to fiber reinforced plastic pipe tees because of the inherent ductility of the metal as contrasted with brittle behavior of the fiber reinforced plastic. Because of such ductility stress distributions can be tolerated which are unacceptable in a fiber reinforced plastic pipe tee. Such metal bodies, of course, have no problems associated with filament winding.

A variety of configurations have been proposed for alleviating the adverse stress distributions in the diaphragm area, such as, for example, making the center portion of the tee as a sphere or ellipse. Such a tee is in the form of a sphere with three arms protruding from it. Such a pipe tee is described and illustrated in U. S. Pat. No. 3,765,979, by Thomas. The pattern of windings provided in that patent can produce a tee suitable for resisting internal pressure but unsuited for a rigid piping system.

The tee in the Thomas patent is suitable for a "blocked" piping system where the pipes and/or fittings are rigidly mounted or "blocked" so that no appreciable longitudinal loads are transmitted through the joints between pipes and fittings. In such a system an O-ring joint or the like is used between the end of a piece of pipe and the tee, for example. Such a joint can accommodate limited longitudinal motion, hence imposes little, if any, longitudinal stress on the tee. The blocking of the piping system also minimizes bending loads. In such a system the pipe tee is subject to internal pressure stresses and is virtually free of longitudinal stress and bending.

Since construction of a blocked piping system with rigid mounting is costly, it is considerably more common to form an integral pipe system by cementing the pipe fittings, including tees, onto the pipe. In such a system the pipe tee is essentially a closed end pressure vessel which is subject to longitudinal stress as well as the hoop stresses due to internal pressure. The pipe tee is also quite likely to be subject to bending stresses due to installation misalignments or changes in dimension during operation. A pipe tee suitable for such service requires strength in directions not provided by the winding pattern in the Thomas patent, since that tee is designed for a different type of service. Further, since the tee in the Thomas patent has limited longitudinal and bending stresses an abrupt transition between the central body portion and the three tubular extensions can be acceptable. A different configuration must be provided for a tee employed in a system having substantial longitudinal and bending stresses both for resisting such stresses and to permit winding filaments in the necessary directions without bridging of the filaments across recessed regions of a mandrel. Winding patterns must be developed which cover such a tee thoroughly with filaments extending in the principal stress directions without use of excessive material and without bridging. It is also desirable that the winding patterns be readily implemented in mechanized winding equipment so that tees can be made economically and with good reproducibility.

It is also desirable to develop a configuration for the diaphragm area of a tee which provides good resistance to biaxial stresses and avoids problems in winding the tee.

DEFINITIONS

For purposes of description in this specification, it is convenient to adopt nomenclature representing various portions of a pipe tee such as is provided in practice of this invention. The following glossary of terms is therefore adopted:

Run: The straight portion of the tee through which fluid can flow in a straight path.

Branch: The cross member of the tee transverse to the run through which fluid can flow in a right angle path between the branch and run.

Tee Diameter: The nominal diameter of the pipe with which the tee is used; also, the nominal diameter of the run and branch.

Mid-Plane: The plane of symmetry through the tee including the axes of the run and branch.

Side: A portion of the tee on one side of the mid-plane.

Back: A portion extending along the run of the tee on the opposite side of the run from the branch.

Front: A portion of the run facing in the same direction as the branch.

Crotch: Each of the two portions between the branch and an end of the run of the tee, including a portion that is concave in the mid-plane of the tee.

Crotch Radius: The radius of curvature of the crotch in the mid-plane of the tee.

Diaphragm: A generally triangular area on each side of the body of the tee adjacent the intersection of the run and branch and more or less parallel to the mid-plane. The size and shape of the diaphragm are defined to some extent by geometry of the crotch.

Bell: A cylindrical socket at each end of the run and at the end of the branch, having an inside diameter for receiving the outside of the end (spigot) of a piece of pipe with which the tee is used.

Bell Step: An internal step, generally rounded, between the inner end of the bell and the body of the tee which limits the depth of insertion of a pipe into the bell.

Radial Cross Section: A cross section through the tee normal to the mid-plane and formed on two planes, one of which extends radially in one crotch, and the other of which extends radially in the other crotch or radially across the back of the run.

It is also convenient for purposes of description to define an orthogonal coordinate system for the tee. The X axis is the axis of the run. The Y axis is the axis of the branch. The X-Y plane in this system is the mid-plane of the tee. The Z axis is normal to the mid-plane and extends through the intersection of the X and Y axes.

BRIEF SUMMARY OF THE INVENTION

Thus, there is provided in practice of this invention, according to a presently preferred embodiment, a fiber reinforced plastic tee formed of a plurality of different wrap patterns selected from the group consisting of:

I—starting at one side of an end of the run, extending helically with a first hand around the back of the run, through the opposite crotch, then helically with a second hand around the back of the run, and ending at the opposite side of the run at the same end;

II—starting at one side of an end of the run, extending helically with a first hand around the back of the run, then through the opposite crotch, then circumferentially around the opposite bell and/or bell step of the run at least one revolution back to the crotch, then helically with a second hand around the back of the run, and ending on the opposite side of the same end of the run;

III—starting near the back of the run at one end, extending helically around the run across the diaphragm area, then through the opposite crotch, then circumferentially around the bell and/or bell step of the branch at least one-half revolution, then through a crotch, then helically around the body of the tee across a diaphragm area, and ending near the back of the run at an end;

IV—starting at one end of the run extending helically around the run across a center portion of the back of the run and ending at the opposite end of the run;

V—starting from a crotch, extending helically across one side of the tee and around the back of the run, then across the opposite side of the tee crossing the center plane of the branch near the bell step of the branch and ending at the end of the branch;

VI—a generally 8-shaped pattern starting in one crotch, extending helically with a first hand around the center portion of the back of the run, then through the opposite crotch, then helically with a second hand around the center portion of the back of the run, and ending in the starting crotch; or a variation starting in one crotch, extending helically with a first hand around the center portion of the back of the run, then through the opposite crotch, then an odd number of half turns around the branch to the starting crotch, then helically with a second hand around the center portion of the back of the run, and ending in the opposite crotch; and.

VII—interlacing these wrap patterns.

Preferably an intermediate layer of wraps includes a tape having a warp comprising several strands of non-reinforcing fiber as a carrier warp, and a weft comprising bundles of substantially straight glass fibers carried by the carrier strands.

DRAWINGS

These and other features and advantages of the present invention will be appreciated as the same becomes better understood by reference to the following detailed description when considered in connection with the accompanying drawings wherein:

FIG. 3 is a schematic representation of a wrap pattern for forming the pipe tee;

FIG. 4 is another schematic illustration of another wrap pattern for forming the pipe tee;

FIG. 5 is another schematic illustration of another wrap pattern for forming the pipe tee;

FIG. 6 is another schematic illustration of another wrap pattern for forming the pipe tee;

FIG. 9 is another schematic illustration of another wrap pattern for forming the pipe tee;

FIG. 10 is another schematic illustration of another wrap pattern for forming the pipe tee;

FIG. 11 illustrates a variant of the wrap pattern of FIG. 10;

FIG. 12 is another schematic illustration of another wrap pattern for forming the pipe tee;

FIG. 13 is another schematic illustration of another wrap pattern for forming the pipe tee;

DESCRIPTION

A fiber reinforced plastic pipe tee is formed by winding fiber reinforcements on an expendable mandrel having an external configuration corresponding to the internal shape of the tee being formed. Reinforcing fibers coated with epoxy resin or the like are wound on the mandrel until a sufficient thickness of material has been built up in all areas to withstand the stresses imposed on the pipe tee. The resin is cured, such as by heating, and excess material at the ends of the tee is trimmed off. The frangible or soluble mandrel on which the tee is wound is shattered or dissolved. If desired a protective film can be applied to the mandrel before winding to become part of the tee and protect the plastic from materials carried in the tee.

Figure 1:
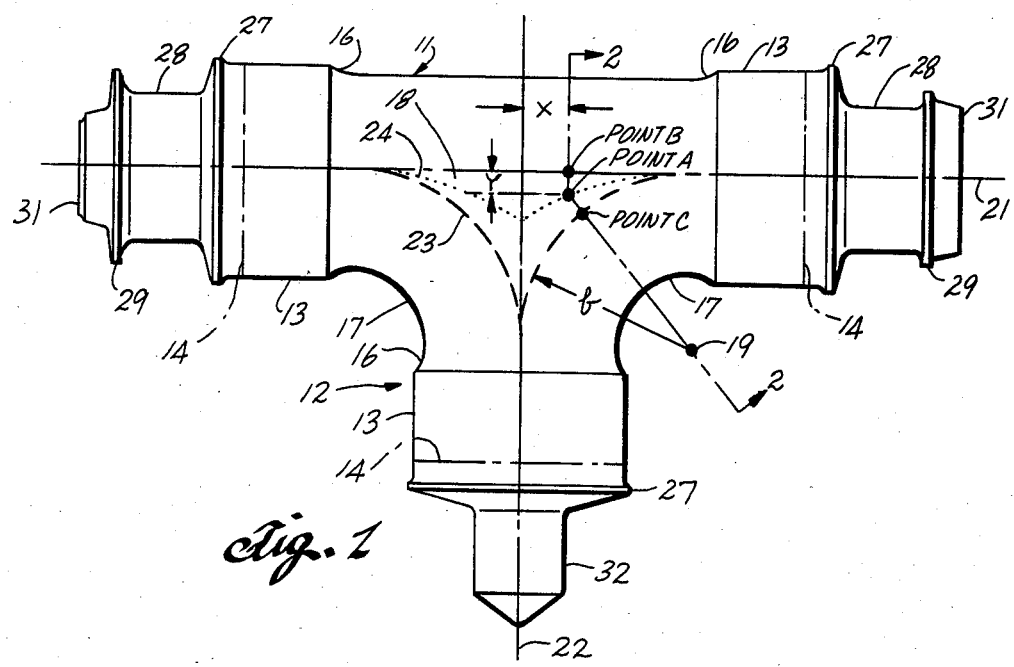
FIG. 1 illustrates in side view a destructible mandrel on which a fiber reinforced plastic pipe tee constructed according to principles of this invention is wound.
Figure 2:
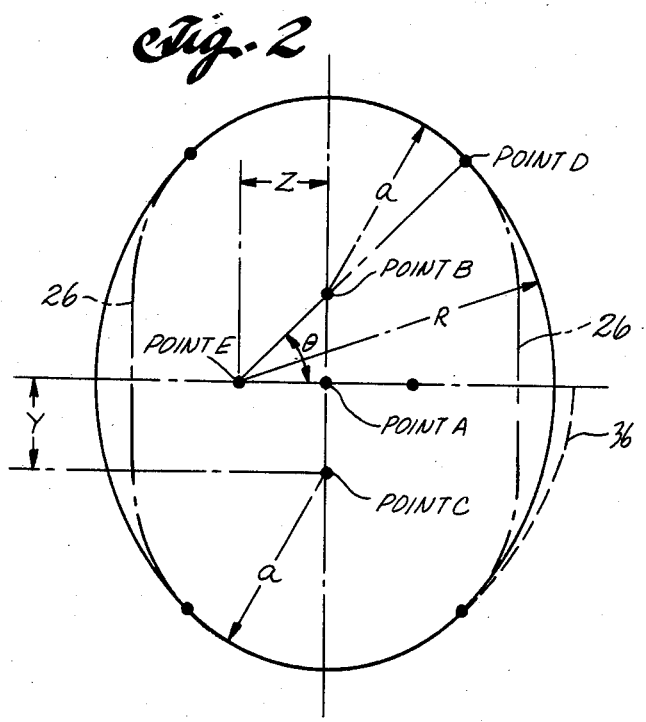
FIG. 2 is a radial cross section through the tee on line 2—2 in FIG. 1.

Such an internal mandrel is illustrated in side view in FIG. 1 and in an approximation of a representative radial cross section in FIG. 2. The definitions set forth above for the tee are applicable to the mandrel. Thus, the mandrel has a straight run 11 and a side branch 12 perpendicular to the axis of the run. At each end of the run and branch there is an enlarged bell 13. The diameter of the bell corresponds to the outside diameter of the end or "spigot" of a pipe with which the tee is used, allowing for clearance for adhesive used in assembling the pipe and tee. That is, the bell on the mandrel has an outside diameter corresponding to the inside diameter in the bell of the tee within which the pipe can be inserted. Regardless of the presence of the bells, the run and branch can each be considered to be in the general form of a right circular cylinder.

A phantom line 14 is shown on each bell 13 indicating the place where the tee is trimmed. When the tee is wound on the mandrel some of the winding material builds up on the end portions of the mandrel beyond the trim lines 14. It is desirable to minimize the quantity of material beyond the trim lines for minimizing waste.

A bell step 16 is provided inboard of each bell 13 extending between the larger diameter of the bell and the smaller diameter of the tee. The nominal tee diameter, that is, the diameter of the run and branch, is the nominal diameter of pipe with which the tee is used. The bell step limits the distance the end of a pipe can be inserted into the bell.

A crotch 17 is formed between the branch 12 and each end of the run 11.

A generally triangular diaphragm area 18 is defined on each side of the tee where the run and branch intersect. Assuming that a tee were made with a cylindrical branch intersecting a cylindrical run with no radius in the crotch there would be a line intersection and the diaphragm area would be nil. As the radius of the crotch increases, the size of the diaphragm area also increases and the centroid of the diaphragm area shifts towards the end of the branch.

Absent special measures such as provided on the mandrel herein described and illustrated, the diaphragm area would be flat and subject to high stresses. A symmetrical bulge is therefore formed on the mandrel centered on the centroid of the diaphragm area. The bulge blends smoothly into all portions of the branch and run and into both crotches therebetween. The bulge is large enough to alleviate the adverse stress distribution if the diaphragm area were flat and is small enough that it does not introduce bridging or other problems during winding of reinforcing fibers on the tee. A smooth transition between the bulge and adjacent portions of the tee is important not only for stress distribution but also for winding filaments without bridging.

The surface of each crotch 17 includes a portion in the form of a part of a torus. The minor radius of the torus (i.e., the radius of the circular generatrix) is the same as the radius of the run. The center 19 of the torus is equidistant from the axis 21 of the run (Y axis) and the axis 22 of the branch (X axis) in the mid-plane of the tee and located so that the center 23 of the generatrix of the torus is tangent to these axes as near the inner end of the bell step 16 as possible. The center 23 of the generatrix of the torus in each crotch is illustrated as a dashed line in FIG. 1. The major radius of the torus is the distance from the center 19 to the center 23 of the circular generatrix of the torus. This gives the largest possible crotch radius within the length limits of a standard size tee. It also assures smooth blending of the crotch into the run and branch. The crotch radius (i.e., the radius of the curvature of the crotch in the mid-plane of the tee) is the difference between the major and minor radii of the torus.

It is convenient to define a "directrix" for determining the geometry of the bulge in the diaphragm area. As used herein, the directrix is the locus of points in the mid-plane of the tee that is equidistant from the center 23 of the generatrix of the torus forming one crotch and either (a) the axis of the run, or (b) from the center of the generatrix of the torus forming the other crotch. Two of the three legs of the directrix are illustrated in FIG. 1 as a dotted line 24 extending from a point of tangency with the axis 21 near each end of the run to an intersection with the axis 22 of the branch. The third leg of the directrix then extends along the axis of the branch. The intersection of the directrix 24 with the axis 22 of the branch is regarded as the centroid of the diaphragm. A circle (not shown) centered on the centroid and having a radius equal to the distance from the centroid to the axis of the run is tangent to the center 23 of the generatrix of each of the toruses.

FIG. 2 is an arbitrarily selected representative radial cross section through Point A taken on line 2—2 in FIG. 1. This cross section extends as a radial plane through the torus of one crotch to the intersection with the directrix and then in a radial plane through the back of the run. Point A is the intersection of the radial cross section with the directrix at a location with coordinates X and Y. Point B is on the axis of the run. Point C is on the center of the generatrix of the torus. Points B and C are equidistant from Point A because of the definition of the directrix.

As pointed out in greater detail hereinafter, the radial cross section illustrated in FIG. 2 is an approximation of the actual radial cross section of a mandrel formed in accordance with the techniques described. This cross section is useful for exposition of the geometry of the bulge formed on each side of the tee and the technique for forming such a bulge. Because of practical machining considerations, the bulge differs slightly from the mathematical approximation and an indication of the actual radial cross section obtained is included as a dashed line 36 in FIG. 2.

Such a radial cross section is bilaterally symmetrical on opposite sides of the directrix regardless of the arbitrarily selected location of Point A. It can be noted that this is also true for a radial cross section taken through a "Point A" located on the axis of the branch. Such a cross section extends along radial planes through each of the two toruses in the respective crotches. It can also be noted that if "Point A" is the centroid of the diaphragm there is three-way symmetry; that is, on a radial plane through each torus and on a radial plane through the run.

The diaphragm is a roughly triangular area on each side of the body of the tee subject to substantial stress when the tee is pressurized. The diaphragm area 18 outlined in FIG. 1 is a projection of the axis 21 of the run and the center 23 of the generatrix of the torus in each crotch. A flat area having this shape would be present on a tee made with each crotch in the form of a simple torus and with the branch and run each in the form of a right circular cylinder. FIG. 2 includes a phantom line 26 along each side indicating the shape of a diaphragm at Section 2—2 if the tee were made with a cylindrical run, a cylindrical branch, and a simple torus in each crotch, that is, without the bulges on each side. Such a diaphragm has a large flat area, at a distance from the mid-plane corresponding to the radius of the run and has high stresses because of the flat area subjected to internal pressures within the tee. Such a flat area is to be avoided when a pipe tee is made with material such as glass fiber reinforced epoxy that has little, if any, ductility.

As mentioned above, a symmetrical "bulge" is formed on each side of the tee centered over the centroid of the diaphragm area 18. The bulge blends smoothly into the torus in each crotch and into the cylindrical surface of the run. Bilateral symmetry in each radial cross section through the directrix as hereinabove described is maintained. It should be noted that the back of the run opposite the branch is straight; that is, the back of the run remains substantially as a cylinder and the bulge does not extend around the back. Extending the bulge around the back of the run does not increase the strength in that region and can be a detriment in resisting longitudinal stress. It can increase the amount of material needed without concomitant benefit.

The geometry of the bulge can be expressed in mathematical terms as two numbers, R and Z. This can be understood by considering the machining employed for forming a mold in which the mandrel illustrated in FIGS. 1 and 2 is cast. Such machining can be done with a ball mill or fly cutter having a spherical radius R. The center of the ball mill is placed at a position above the directrix defined by X and Y coordinates such as in the Z direction above Point A. The ball mill is plunged into the mold so as to cut beyond the plane of the diaphragm area illustrated in FIG. 1 to form a spherical depression in the mold, hence, a spherical bulge on the mandrel. The number Z is the coordinate of the center of the spherical mill above the mid-plane of the tee at the full depth of the cut.

A plurality of such spherical indentations are formed in the mold with the center of the ball mill traversing a series of X and Y coordinates along each leg of the directrix. The radius R of the sphere and the depth of plunge in the Z direction beyond the plane of the diaphragm are determined mathematically for the X and Y coordinates at selected locations on the directrix.

To make an absolutely smooth surface on the bulge and transition to the cylinder and toruses an infinite number of such machining cuts would be required along the directrix. In a practial pipe tee this is not required and fewer than a score of such machining cuts can be employed with half a dozen sizes of ball mills. The slight irregularities remaining can be sanded away by hand to form an essentially smooth surface having nearly the desired geometry. For example, the bulge on a three inch tee can be made with one cut at the centroid and half a dozen cuts along each leg of the directrix, leaving less than 1/32 inch hand smoothing.

It should be noted that the representative radial cross section shown in solid lines in FIG. 2 does not actually exist except at the centroid of the diaphragm when a mold is made with a machining technique using a spherical mill or the like as described. This is due to the intersection of the sphere of the mill with the cylindrical projection of the run or branch in locations beside the representative cross section. For example, a spherical mill can also remove material from the mold at a location along the run nearer the end of the run than the center of the sphere. This is a consequence of the radius R of the sphere being larger than the nominal radius of the run (or branch).

Generally speaking, the largest radius sphere is employed opposite the centroid of the diaphragm. The sphere becomes progressively smaller along each leg of the directrix approaching the radius of the run (or branch) at the end of each leg. The larger radius ball mill removes some material from a region to be machined by an adjacent smaller radius ball mill. The consequent deepening of the recess machined in the mold is centered along the directrix. Thus, the bulge on the mandrel cast in that mold is somewhat further from the mid-plane than projected solely on the basis of the representative cross section illustrated in FIG. 2. In effect, the representative cross section is only a two-dimensional consideration and the actual machining operations occur in three dimensions. A dashed line 36 is included in one sector of the cross section in FIG. 2 indicating an approximation of the actual cross section obtained by a machining technique as herein described. The dashed line represents a surface having a series of circular arcs formed by successive ball mills and blended together by hand smoothing, the arc nearest the centroid representing a larger ball mill and the arcs further from the centroid representing progressively smaller ball mills.

The representative radial cross section illustrated in solid lines in FIG. 2 is useful for defining the radius of the ball mill and the X, Y and Z coordinates of each machining cut to provide smooth blending of the bulge into the run and branch cylinders, and the torus in each crotch.

The radius R of the ball mill and the Z coordinate of the center of the spherical mill above the mid-plane of the tee at the full depth of the plunging cut can be determined by four equations. Two of these equations are employed when the X coordinate is greater than zero, that is, the Y coordinate is less than the distance between the centroid of the diaphragm area and the axis of the run. This corresponds to the two dotted line portions of the directrix 24 illustrated in FIG. 2. A second set of equations is employed for determining R and Z when X equals zero, that is, as Y increases along the portion of the directrix along the axis 22 of the branch beyond the centroid.

When X is different from zero, the Y coordinate for each X coordinate along the directrix is found by the equation $Y=(b-x)^2/4b$, where b is the major radius of the torus. At the centroid of the diaphragm the Y coordinate is b/4.

When X is different from zero and Y is less than b/4, the Z coordinate and spherical radius R are determined by the equations:

$$Z = \frac{(b - X)^2}{4b \tan\theta}$$

$$R = \frac{Y}{\sin \theta} + a$$

When X equals zero and Y is equal to or greater than b/4, the coordinate Z and radius R are determined by the equations:

$$Z = \frac{[(b - Y)^2 + b^2]^{\frac{1}{2}} - b}{\tan \theta}$$

$$R = \frac{Z}{\cos \theta} + a$$

In these equations a is the radius of the run (and also the minor radius of the torus) and b is the major radius of the torus. The angle $\theta$ is in the range of from 25° to 75° and preferably is 40° to 50°.

The angle $\theta$ can be understood by reference to FIG. 2 which is an arbitrary radial cross section through the tee as hereinabove described. For the bulge to blend smoothly into the surface of the run or crotch, the circular cross section of the bulge should intersect the circular cross section of the run (for example) where the radii of both circles are coincident; that is, where tangents to the two circles are coincident. For each cross section of the type illustrated in FIG. 2 there are four points where the circles of the bulge and the run or crotch are tangent as indicated by Point D. A line from such a point of tangency through Point B (the axis of the run), for example, intersects a line perpendicular to the directrix at the angle $\theta$ at Point E which has the coordinate Z determined by one of the equations set forth hereinabove. To make a cut in a mold for casting the mandrel, a mill with spherical radius R is plunged into the mold until the center of the radius on the mill is at Point E, that is, it has a coordinate Z above the midplane.

The choice of angle $\theta$ is determined in part by the radius of the crotch. A smaller angle $\theta$ is appropriate when the radius is large and a larger angle $\theta$ is preferred when the crotch radius is small. This is a function not of the absolute radius of the crotch but of the radius relative to the radius of the run. The preferred angle $\theta$ can be considered as a function of the major and minor axes of the torus forming each crotch.

The size of the torus that can be accommodated in the crotch of a tee is constrained by the standard sizes of fittings that have been adopted by industry. For example, the total length of a tee of a given diameter has been specified so that the designer of a piping system can fix the dimensions of the system without regard to the source of the fittings. Because of such constraints, the torus in a two inch tee has a ratio of b/a (major radius over minor radius) of about 1.9. On a twelve inch tee the b/a ratio is about 1.54. Intermediate sizes have intermediate ratios. For example, a nominal four inch tee has a b/a ratio of about 1.75.

When the b/a ratio is as low as 1.5, the angle $\theta$ is preferably in the range of from about 35° to 75° and most preferably is about 50°. When the b/a ratio is about 1.9, the angle $\theta$ is chosen in the range of from about 25° to 55° and most preferably is about 40°. When the b/a ratio is about 1.75, the angle $\theta$ is chosen in the range of from about 30° to 65° and preferably about 45°. When the b/a ratio is between 1.5 and 1.9, the angle $\theta$ is in a range that is an interpolation between the ranges set forth above.

If the angle $\theta$ is less than the lower number for the various ratios mentioned above, the diaphragm area on the tee is so nearly flat that there is insufficient benefit in stress distribution so that an excess of winding material can be required for obtaining appropriate strength in the diaphragm area. Extra material is needed in the diaphragm area for resisting the pressure and longitudinal stresses and in addition an excess of material can be built up in the adjacent areas as additional windings are applied. In particular, an excess of material can accumulate on the back of the run due to the winding patterns used to cover the diaphragm area. Such use of excess material can contribute significantly to the cost of the tee since the materials are expensive.

If the angle $\theta$ is more than the larger numbers mentioned above for various b/a ratios, an excessively large bulge is formed on the sides of the tee, leading to difficulties in winding reinforcing fibers onto the tee. Difficulties can arise due to bridging in the vicinity of the bell step on the branch when there is a large bulge on the side of the tee. Further, an excess of material can accumulate in the center of the back of the run. The large bulge can also be undesirable for optimum flow characteristics through the tee.

Preferably, the angle $\theta$ is about 40° to 50° since this gives optimum curvature for strengthening the diaphragm area without leading to winding problems in a fiber reinforced plastic pipe tee.

FIG. 2 is a cross section through a tee where the angle $\theta$ is chosen as 45°. If the angle $\theta$ were 30° for example, the intersection of the bulge with the run would be further from the mid-plane of the tee. Point E would be much further to the left in FIG. 2 (Z would be larger) and the diaphragm region would be more nearly flat, i.e., closer to the phantom line 26 in FIG. 2. If the angle $\theta$ were 65°, the bulge would be much larger and the radial cross sections more nearly circular.

In the exemplary embodiment the angle $\theta$ is chosen as 45° throughout the traverse along the directrix. As another approximation of an elliptical bulge, the angle $\theta$ selected for each cut can progressively change for each position along the directrix, tending to be smaller near the centroid and gradually increasing toward the end of the directrix.

Each radial cross section through the bulge could be made in the form of a mathematical ellipse and have complete bilateral symmetry across the Z axis. This is not necessary for a practical fiber reinforced plastic pipe tee and a psuedo-ellipitcal cross section which is a close approximation of an ellipse is quite satisfactory. Each pseudo-elliptical radial cross section is centered on the directrix. In the bulge the largest difference between the major axis and the minor axis of the cross sections is greatest through the centroid of the diaphragm. The difference decreases smoothly towards zero in planes through the center 19 of each torus and normal to the axis of either the run or branch. Thus, the cross section reduces to a circle where the center of the generatrix of the torus is tangent to the respective axis adjacent the bell step. Because at each radial cross section the bulge is tangent to the cylindrical run and the torus of the crotch, the transitions at the edges of the bulge are smooth.

A most significant selection of the angle $\theta$ and hence, the radius R of the sphere, is at the centroid of the diaphragm. This selection determines the principal dimensions of the bulge on each side of the tee. The balance of the values of R and $\theta$ along each leg of the directrix help define a smooth transition between the central portion of the bulge and the surfaces of the run, branch and torus in each crotch. The value selected for the angle $\theta$ at locations along each leg of the directrix can therefore differ from the values set forth above as preferred for the center of the bulge without significantly changing the effect of the bulge. It is convenient, however, to select the same angle $\theta$ throughout the length of each leg of the directrix.

Preferably, the maximum height of the bulge above the mid-plane of the tee, i.e., above the centroid of the diaphragm, is in the range of from (a+0.06b) to (a+0.16b). Preferably, the height of the bulge at its centroid is in the range of (a+0.09b) to (a+0.12b). Stated otherwise, the height of the bulge above the diaphragm plane 26 (which is at radius a) is in the range of from 6 to 16% of the major radius of the torus and is preferably about 9 to 12% of the major radius of the torus. If the height of the bulge is less than about 6% an excess of material must be built up in the diaphragm area to resist stresses. If the height is more than about 16% problems can be introduced in winding fibers on the tee. A maximum height of the bulge at its centroid of about 9 to 12% of the major radius of the torus provides a good balance between stress distribution and ability to wind the fiber reinforced tee without bridging or other difficulties.

To facilitate winding strands of reinforcing fiber for forming a pipe tee, each end of the mandrel has structure beyond the trim line 14. A circumferential flange 27 at the end of each bell 13 keeps circumferential windings placed around the bell from slipping off the end during winding. A smaller diameter drum or post 28 is provided at each end of the run. These drums provide locations from which wrap patterns can commence. Flanges 29 on outer ends of the drums also help retain reinforcing fibers in position. A boss 31 is also provided at each end of the run for supporting the mandrel. A generally cylindrical nose 32 is provided beyond the flange 27 on the branch.

A pipe tee is preferably wound using glass roving. A roving is a bundle of small diameter substantially parallel glass fibers. Several such rovings can be wound in parallel in the form of a band two centimeters or more in width. Such rovings can be immersed in a liquid epoxy resin, for example, before winding, for forming a dense layer of plastic reinforced by glass fibers on the mandrel.

Figure 14:
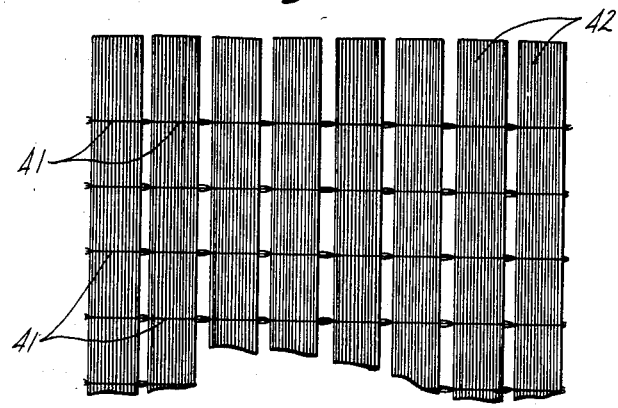
FIG. 14 is a view of one face of a glass fiber tape useful for winding pipe tees.

Another material particularly useful for winding a pipe tee is referred to herein as a tape. It is not the usual woven strip employed in hand lay-up of pipe tees where both the warp and weft are glass fibers. As illustrated in FIG. 14 the preferred tape has several synthetic warp strands 41, such as nylon, serving as a carrier web for short parallel bundles 42 of straight glass fibers as a weft. The carrier fibers have very little strength as compared with the glass and hence are not reinforcing fibers in the completed tee. Such a tape is commercially available and has been used with polyester resin for forming boat hulls, for example.

A typical tape suitable for winding a pipe tee has about a dozen warp strands of nylon spaced apart across the width of the tape for supporting the weft. The weft is formed of bundles of parallel glass fibers about 6 centimeters long. The bundles are made of short glass fibers ending at the end of the bundle as distinguished from a woven fabric in which the weft strands are continuous fibers repeatedly doubled back on themselves at a selvage. A typical bundle is about 3 millimeters wide and a small fraction of a millimeter thick. The warp strands are knitted into a series of interlocking loops with each loop loosely holding a bundle of glass fibers. This leaves the bundles somewhat spaced apart along the length of the tape, the space between adjacent bundles being in the order of 1.5 to 2 millimeters. Other dimensions of such tapes are useful.

Such a tape is particularly useful for forming a pipe tee since the loosely knitted synthetic warp strands can stretch and slip laterally for curving the tape without bunching or deforming the bundles of glass fibers. The loose looping also permits skewing; that is, when the tape is wound on a mandrel the bundles of glass fibers need not remain perpendicular to the warp strands, although the bundles of glass fibers remain essentially parallel to each other. This is significant so that the tape can lie against the curved surfaces of the tee, particularly in the crotch region, and the bundles of glass fibers can be maintained in alignments that are parallel to the principal directions of stress, thereby forming a strong pipe tee with minimal use of material. Such a tape is preferred over woven fabric because of such properties.

Figure 15:
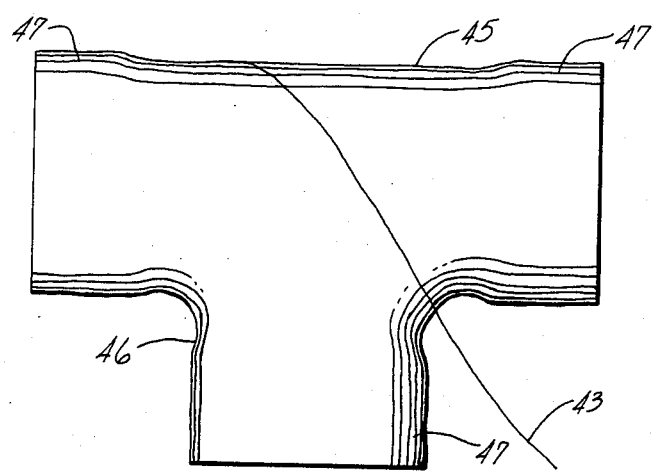
FIG. 15 is a side view of an exemplary pipe tee constructed according to principles of this invention.

An exemplary pipe tee constructed according to principles of this invention is illustrated in a side view in FIG. 15. Such a tee is formed by winding resin coated glass fiber rovings 44 or tape (not shown in FIG. 15) onto a mandrel such as illustrated in FIG. 1 until a sufficient thickness is built up to obtain the desired strength. The resin is cured and the mandrel removed. The ends of the tee are trimmed (e.g., along lines 14 in FIG. 1) to remove excess material. The exterior of the tee conforms generally to the mandrel with a straight run 45 and a lateral branch 46. Each end has a bell 47 having an inside surface corresponding to the bell surface 13 on the mandrel. Some of the precise geometry of the inside of the tee is lost on the exterior due to the inherent roughness of the body produced by the winding process.

To form a pipe tee by winding a mandrel with resin coated fibers a plurality of different wrap patterns are employed. Each wrap is capable of covering a portion of the mandrel and collectively the wraps can cover the entire mandrel for forming a tee having adequate strength throughout. There is no single wrap that can cover the entire tee and a combination of patterns is needed. These patterns can be described by the path of a roving or tape extending from an end of the tee along a path on the body and off an end of the tee, or a path commencing at a location on the body of the tee and extending along the body of the tee either to an end or to a location on the body. Such an end can be at either end of the run or the end of the branch.

For convenience in this description these patterns are lettered by lower case letters enclosed in parentheses. Basic patterns are described commencing, for example, at one location such as an end of the run. It will be understood that mirror images of such patterns, such as commencing at the opposite end of the run, are included.

Eight basic patterns useful for wrapping a pipe tee are illustrated in FIGS. 3 to 10. These drawings are schematic and ignore the enlarged bell and bell step, the bulge on the side of the tee and the drums and nose at the ends of the tee. Such details have been deleted to avoid obscuring the winding patterns. Since the illustrations are schematic they are not necessarily accurate projections. These patterns are representative and variations are employed covering adjacent areas on the tee so that the entire tee area can be covered.

Each pattern is illustrated by a line extending around the tee. Such a line can be thought of as a roving wrapped on the tee. When the line is on the exposed portion of the tee, it is continuous with superimposed arrowheads indicating direction for purposes of understanding. When the line is on the hidden portion of the tee it is in effect a dashed line and only arrowheads are illustrated.

These wrap patterns are described as having a first hand of helix or a second hand of helix. A particular pattern may be illustrated as a right-handed helix, however, it will be understood that a mirror image of the pattern can be a left-handed helix. Similarly, such a pattern can commence at an opposite end of the tee or on the opposite side of the mid-plane to thoroughly cover the tee.

Figure 7:
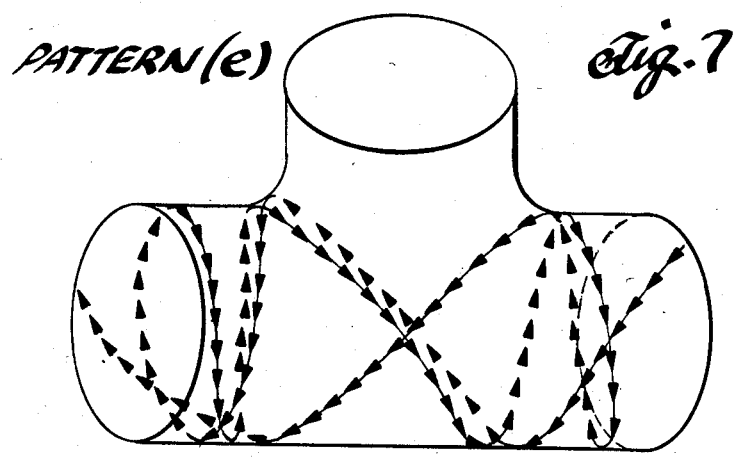
FIG. 7 is another schematic illustration of another wrap pattern for forming the pipe tee.
Figure 8:
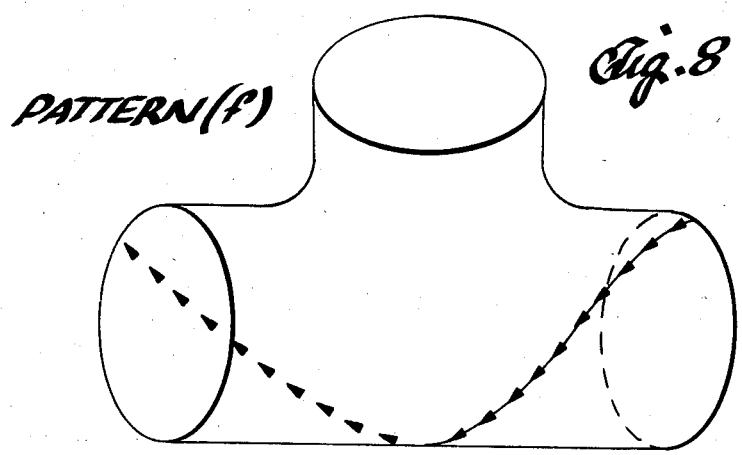
FIG. 8 is another schematic illustration of another wrap pattern for forming the pipe tee.

Basic patterns include the following:

(a) starting at one side of an end of the run, extending helically with a first hand around the back of the run, through the opposite crotch, then helically with a second hand around the back of the run, and ending at the opposite side of the run at the same end, as illustrated in FIG. 3;

(b) starting at one side of an end of the run, extending helically with a first hand around the back of the run, then through the opposite crotch, then circumferentially around the opposite bell step of the run at least one revolution back to the crotch, then helically with a second hand around the back of the run, and ending on the opposite side of the same end of the run, as illustrated in FIG. 4;

(c) starting on one side of the tee near the back of the run at one end, extending helically with a first hand around the run across the diaphragm area, then through the opposite crotch, then circumferentially around the bell step of the branch at least one-half revolution, then through the nearer crotch, then helically with a second hand around the body of the tee across the same diaphragm area, and ending on one side of the tee near the back of the run at the opposite end, as illustrated in FIG. 5;

(d) starting near the back of the run at one end extending helically with one hand around the run across the diaphragm area, then through the opposite crotch, then circumferentially around the bell of the branch at least one-half revolution, then through the nearer crotch, then helically with a second hand around the body of the tee across the same diaphragm area and ending near the back of the run at the opposite end, as illustrated in FIG. 6;

(e) starting on one side at an end of the run, extending helically with a first hand around the back and the opposite side of the run, then through the opposite crotch, then circumferentially around the bell and/or bell step at the opposite end of the run, then through the opposite crotch and helically with a second hand across the starting side of the run and circumferentially around the bell and/or bell step at the starting end of the run, then through the nearer crotch, then helically with the first hand around the back of the run, and ending on the starting side of the tee at the opposite end of the run, as illustrated in FIG. 7;

(f) starting at one end of the run, extending helically around the run across a center portion of the back of the run and ending at the opposite end of the run, as illustrated in FIG. 8;

(g) starting from a crotch, extending helically across one side of the tee and around the back of the run, then across the opposite side of the tee crossing the center plane of the branch (Y-Z plane) near the bell step of the branch and ending at the end of the branch, as illustrated in FIG. 9;

(h) a generally 8-shaped pattern starting in one crotch, extending helically with a first hand around the center portion of the back of the run, then through the opposite crotch, then helically with a second hand around the center portion of the back of the run, and ending in the starting crotch, as illustrated in FIG. 10; or a variation starting in one crotch, extending helically with a first hand around the back of the run, then through the opposite crotch, then an odd number of half turns around the branch to the starting crotch, then helically with a second hand around the back of the run and ending in the opposite crotch (as illustrated in FIG. 11).

If desired, before commencing such windings the surface of the mandrel can be covered with a film that bonds to the plastic and protects the plastic of the tee from corrosive contents when the tee is put in service.

To make the windings on the mandrel for forming a pipe tee, one end of a roving is connected to a drum 28 at an end of the tee. Masking tape or the like followed by a few circumferential turns around the drum provides a sufficiently secure attachment. The winding is then carried over the flange 27 on to the bell at the end of the run at a selected location and helix angle for commencing one of the patterns.

The preferred helix angle along the cylindrical portion of the run or branch is about 54° for resisting both the internal pressure and the longitudinal stress due to use of the tee in a system applying stresses analogous to a closed end pressure vessel. The helix angle is the angle between the helical path and the axis of the run, for example. In the region of the diaphragm it is preferred that the windings tend to be orthogonal to each other, hence, the helix angle tends to approach 45° relative to the axis of the run. The average helix angle on the tee is typically less than the optimum 54°. Average helix angle on a specific pipe tee depends in part on the total length of the tee. For example, a nominal two inch tee has a length of about five diameters while a tee six inches or larger has a total length of only about three diameters. On a relatively long tee the helix angle can change along the length of the run and more closely approach the optimum 54° at the end of the bell than in a shorter tee.

The helix angle referred to is for windings traversing the surface diagonally. It will be recognized that parts of several winding patterns are only slightly diagonal or could be considered to have a helix angle of almost 90°. When such a winding is made with a tape, the reinforcing fibers have a helix angle approaching 0°. When longitudinally extending and circumferentially extending fibers are present due to such windings it is desirable to have about 100% greater strength in the circumferential direction due to a larger number of fibers than in the longitudinal direction. This provides a structure having strength approximately the strength of a structure in which all windings are at about 54°.

Not all of the helical paths on the run of the tee are at the average helix angle. Typically, the helix angles are within a range of plus or minus 10° from the average helix angle so that the helical paths can cover all portions of the tee and still fit tightly against the surfaces without slippage parallel to the surface of the mandrel. Some change in the helix angle can occur along the length of the helix as the effective diameter of the helix changes on different portions of the tee. Thus, for example, the helix angle may be different as a winding crosses the bulge in the diaphragm area as compared with the helix angle of the same helical path adjacent the bell step.

An example of change in helix angle in different portions of a winding is illustrated in Pattern (d). In this pattern the wrap extends towards the end of the branch as a left-handed helix as illustrated in FIG. 6. The helix angle gradually increases as the wrap approaches the end of the branch until it reaches 90° whereupon it becomes a right-handed helix and continues away from the end of the branch with gradually decreasing helix angle. Such a pattern is employed near an end of the tee for reversing direction without going off the end of the tee with consequent waste of material beyond the trim lines. It is significant that the rate of change of the helix angle be small enough that slippage of the roving parallel to the surface of the tee is avoided.

In addition to assuring coverage of the entire tee, it can also be significant to change the helix angle in the various wrap patterns so that each area on the tee has reinforcing fibers extending in a plurality of directions essentially parallel to the surface for resisting biaxial stresses. Preferably fibers are provided diagonally with respect to the axis of, for example, the run of the tee.

A helix angle of concern is the angle as the winding crosses the flange 27 at an end of the mandrel. The diameter of the drum 28 at each end of the run is proportioned in accordance with the average helix angle as the windings cross the flange. The ratio of the diameter of the drum to the diameter of the flange at the end of the bell is the sine of the helix angle. With this proportion a winding can cross the flange without circumferential or longitudinal slippage. Deviations by individual windings of plus or minus 10° from the average helix angle are readily accommodated without slippage due to friction which tends to hold the windings in position on the mandrel.

Pattern (g) which extends off the end of the branch employs the nose 32 for turning. Thus, a roving extends off the branch at a low helix angle, makes a half turn around the nose and returns over the end of the branch at a location spaced apart from where it went off the branch so that the two paths can cross in the region of the bell step. The ratio of the diameter of the nose 32 to the diameter of the flange 27 on the branch is the sine of the average helix angle of the windings in Pattern (g).

Each winding pattern illustrated in FIGS. 3 to 10 provides coverage of a selected region of the tee. Coverage of the bell step at one end of the tee is exemplary. Pattern (a) crosses the bell step in a diagonal direction near the back of the run. Pattern (b) crosses the bell step diagonally on a side of the tee more or less midway between the front and the back. Pattern (f) crosses the bell step diagonally near the front of the tee. These patterns can be applied as right-handed and then left-handed helixes. Collectively, these patterns provide diagonally extending fibers across substantially the entire circumference of the bell step.

Pattern (b) also includes at least one circumferential winding around the bell step providing circumferentially extending fibers. A plurality of diagonal or helical windings of Patterns (a), (b), and (f) can be made across the bell step, followed by a circumferential winding around the bell step. The diagonal windings have a tendency to bridge across the bell step. The circumferential windings compensate for such tendency by forcing the diagonal windings towards the mandrel in the region of the bell step. The region of the bell step can be partly filled with circumferential windings before Patterns (a), (b), and (f) are applied so that outer layers of diagonal windings have less tendency to bridge.

Diagonal fibers cross the back of the run at the midplane by reason of several of the patterns. Pattern (d) provides diagonal fibers at the end of the run. The next region towards the center is covered by Pattern (c) followed by Patterns (a), (b), and (f). Pattern (e) also provides diagonal fibers in a region along the back more or less overlapping regions covered by Patterns (b) and (f). These patterns also build up diagonally extending fibers over the bells at the ends of the run and over much of the sides of the run.

Diagonally extending fibers are laid across the diaphragm by Patterns (a), (c), and (d) and in the outer portions of the diaphragm along the run by Pattern (b).

An area of some difficulty is in the region of the bell step on each side of the branch. This area is covered by Pattern (g) which also provides nearly circumferentially extending fibers across the back of the run. Circumferential fibers around the bell on the branch are provided by Pattern (d) and to some extent Pattern (c). Circumferential fibers around the bells at the ends of the run are provided by Pattern (e). It should be noted that circumferential windings around the bells can be provided as an extension of any of the patterns having a circumferential turn adjacent he bell. Thus, for example, Pattern (b) can be extended to provide circumferential fibers around the bells at the end of the runs.

Diagonal fibers are provided by winding rovings through the crotch at different angles. Pattern (b) applies diagonal fibers in the portion of the crotch near the run. Pattern (a) applies fibers nearer the middle of the crotch. Pattern (c) applies diagonal fibers in the portion of the crotch nearer the branch. Pattern (e) applies fibers near the middle of the crotch at one end and nearer the run at the opposite end. Patterns (c), (d), and (g) provide diagonal fibers on the branch.

As described herein, many of the patterns commence at an end of the run, for example, and terminate at an end of the run. Since a combination of patterns is employed in winding a pipe tee, strict adherence to a pattern as described and illustrated in FIGS. 3 to 10 is not essential. Thus, a shift from one pattern to another can be made on the body of the tee. For example, a shift can be made between patterns as the winding proceeds through a crotch or in a circumferential path around a bell. These switches are more readily made than switches in the course of a helical winding since, with notable exception of Pattern (e), the helix angles generally tend to carry the winding off an end of the tee. Patterns (g) and (h) are exemplary of switches. Each of these patterns commences at a location in a crotch and can be easily interleaved within another pattern that extends through a crotch or circumferentially around a bell at the end of the run.

Such interleaving is not illustrated herein for clarity in the drawings and since a very large number of cross overs from one pattern to another are feasible. Such cross overs between patterns on the mandrel inboard of the trim lines are desirable for minimizing waste of material outboard of the trim lines.

Exemplary of a cross over or switch of patterns is the variation in Pattern (h) mentioned above. In effect, this is a switch from one-half of an 8-shaped pattern commencing with a first hand to half of another 8-shaped pattern having an opposite hand. This cross over is particularly advantageous for interleaving of adjacent windings on both sides of the tee and building up material in the bell step of the branch without extending the windings beyond the trim lines.

Relations will be apparent among the patterns of windings illustrated in FIGS. 3 to 10. Thus, Patterns (c) and (d) are similar except that they cross the branch at different distances from the run. Pattern (b) resembles half of Pattern (e), differing in the helix angle such that a winding in Pattern (b) terminates at an end of the run whereas it could continue through a crotch and, in effect, become half of a Pattern (e).

Variations in the patterns are also apparent. For example, Pattern (c) is described and illustrated as having a one-half turn (or odd number of one-half turns) around the branch so that the winding crosses itself in the diaphragm area on one side of the tee. Such a winding could take an even number of one-half turns around the branch and cross the diaphragm area on the opposite side of the tee.

The variations in Pattern (h) mentioned above are also exemplary. In winding a tee it can be desirable to employ such variations for covering the entire surface with fibers oriented in appropriate directions. For example, the first variant of Pattern (h) can be employed for placing tape in the portion of the crotches adjacent the run and the second variant can be employed for placing tape in the portion of the crotches nearer the branch.

Precession of the patterns at different starting locations and different helix angles is employed for covering all areas of the body of a tee. Pattern (f) is exemplary. One winding of Pattern (f) may start at the front of the tee on one side, cross the mid-plane on the front of the bell, cross the back of the run nearer the opposite end and terminate at the opposite end of the tee on the opposite side relatively near the back. The next winding in Pattern (f) may start at the front of the tee at about the mid-plane, cross the back of the run near the middle and proceed to termination at the opposite end appreciably closer to the front of the tee than the termination of the first winding. Successive windings can commence nearer and nearer the back of the tee and end nearer the front of the tee. The helix angles between successive windings can change so that the windings effectively fan from the back of the run; that is, adjacent windings are relatively closer together at the back of the run and relatively further apart on the bell. Similar variations of each of the other patterns can be employed.

The sequence of patterns for covering the surface of the tee is generally not important, except for minimizing the quantity of winding material built up beyond the trim lines 14. Thus, as many shifts between patterns is made on the tee as feasible to minimize the number of times the winding goes off an end. Further, the patterns are preferably sequenced so that substantially less than a full turn is made around a drum between the end of one pattern and the commencement of the next. It is desirable to change patterns or the hand of patterns frequently rather than build up substantial thickness with one pattern. Crossing fibers are desirable in thin layers since this increases interlaminar shear area as compared with fewer, thicker layers. A stronger part can be made with the same quantity of material.

One can, for example, commence with a few repetitions of Pattern (a) starting at a series of locations at one end of the tee. Patterns (c), (d) and (f) can then be added for providing diagonal reinforcing fibers around substantially the entire circumference of one of the bell steps. Patterns (c), (d), and (f) each commence at one end of the run and terminate at the opposite end of the run. Thus, at a convenient point in this sequence additional repetitions of Pattern (a) can be added at the opposite end of the run. Patterns (c), (d) and (f) can also be employed for changing the hand of the helix at each end of the run. A plurality of repetitions of Pattern (b) can then be superimposed for adding circumferential windings in the bell steps to overcome any briding of the diagonal windings. Suitable repetitions of Patterns (c), (d) and/or (f) can be interleaved with Pattern (b) for changing hand and ends of the tee. Such variations and repetitions are continued for interleaving additional patterns on the tee.

A first layer of windings can be built up on the mandrel, employing a combination of variations of Patterns (a) through (g). This effectively covers the entire mandrel with rovings of glass fiber coated with epoxy. Most areas are covered with diagonally extending fibers.

A second layer is then formed employing a tape as hereinabove described. This intermediate layer contains reinforcing fibers that extend transverse to reinforcing fibers in the first layer by reason of the structure of the tape employed. An important aspect of this layer is in the region of the two crotches. The crotches are subject to hoop stresses which are resisted by essentially radially and diagonally extending fibers in windings extending through the crotches in the first layer. They are also subject to a more or less longitudinally extending stress that is not effectively resisted by the fibers which go through the crotch at a large angle to the mid-plane of the tee. There is a stress in the mid-plane, for example, that tends to pull the run and branch away from each other, or enlarge the angle between the branch and run.

It is therefore desirable to wind a tape through the crotch regions according to Pattern (h). The tape extends through the crotch in an approximately radial plane. This provides reinforcing fibers extending in the desired direction in the crotch; that is, parallel or nearly parallel to the mid-plane. The variation in Pattern (h) places reinforcing fibers on the branch parallel to its axis.

Circumferential windings of the tape around the bells and the back of the run provide longitudinal reinforcement. This is particularly significant in the region of the bell on the branch. Only limited application of diagonally extending fibers can be provided on the bell and bell step by glass rovings without excessive waste as the windings extend beyond the trim lines. The tape applies glass fibers extending longitudinally along the bell and bell step and blending into adjacent parts of the crotch. Circumferential windings of rovings resist hoop stresses. Thus, strength can be built into the branch with somewhat lower efficiency than in areas where diagonal fibers are more readily applied.

Windings of the tape extending diagonally across the diaphragm provide significant reinforcement in that region, as well. In the diaphragm area (i.e., over the bulges) and on some portions of the run the glass fiber bundles forming the weft of the tape tend to skew relative to the winding direction so that they are not normal to the warp. Surprisingly, when such a tape is wound diagonally across the diaphragm area and through a crotch, the weft is skewed so that the reinforcing fibers tend to align themselves with the axis of the branch. This is a direction of weakness and such alignment of the reinforcing fibers is advantageous.

Helix angles of the wraps and the number of wraps of tape in each pattern are selected for building up a desired thickness of reinforcing fibers in each direction in each portion of the tee. This can be accomplished in the intermediate layer using Patterns (a) through (e) and (h).

Coating of such a tape with epoxy or other resin is not convenient. It is therefore desirable to also wind a band of glass fiber rovings on the mandrel coincident with the winding of the tape. The glass fiber rovings are passed through a bath of liquid resin before winding and serve as a carrier for liquid resin for impregnating the tape. This co-winding of tape and roving is also advantageous since it interleaves layers with transverse fibers, significantly increasing interlaminar shear area and strength of the tee.

After the intermediate layer formed of tape and rovings of the desired thickness has been built up over the inner layer on the mandrel, a third or outer layer is built up in a manner similar to the inner layer, using glass fiber rovings. Patterns (a) through (g) are employed for covering the entire area of the tee.

In the embodiments described the inner and outer layers are built up with rovings sandwiching the layer containing tape. This tends to assure a smooth surface on the tee and contain the bundles of glass fibers in the intermediate layer, ends of which might otherwise protrude from the tee. This is particularly significant in some regions where the tape crosses convex portions of the tee and the more or less straight bundles of glass fibers would otherwise extend away from the surface.

There are also advantages to forming a tee using co-windings of rovings and tape for most of the thickness of the tee commencing at the inside surface adjacent the mandrel. In such an embodiment the innermost layer includes the tape and only the outermost layer, which can be relatively thin, comprises only glass rovings for assuring a smooth surface on the exterior of the tee. Protrusion of the ends of fibers from the inside of the tee is not of concern since the resin is cured before removal of the mandrel. This type of winding can be desirable for providing increased interlaminar shear area adjacent the inside surface of the tee.

The tee can be wound by rotating the mandrel and feeding roving and/or tape from a movable source or the roving and/or tape can be fed from rotatable spools moved around the mandrel, or a combination of such motions can be used. After the tee is wound using a combination of winding patterns as hereinabove described, the liquid resin is solidified such as by heating or curing at room temperature. The mandrel is then removed from the tee, either before or after trimming the ends of the run and branch.

The winding patterns employed in the exemplary pipe tee hereinabove described utilize both rovings and the special tape that can deform to fit tightly against surfaces with compound curvature. It can be desirable to construct a pipe tee wound from only rovings. Such a pipe tee involves more waste of material in end trimming than does an embodiment employing the hereinabove described tape. Economic trade offs can be made between end losses, cost increment of tape versus rovings, and the complexity of the winding patterns for each embodiment of pipe tee for selecting a preferred technique for winding a tee.

An area of some difficulty in an embodiment wound entirely with rovings lies in each crotch and particularly in the portion of the crotch in the mid-plane of the tee extending towards the end of the branch. In this region it is difficult to build up reinforcing fibers extending longitudinally along the branch. Additional winding patterns can be employed for building up material in this region.

One such pattern is illustrated in FIG. 12 and is identified as Pattern (i). This winding pattern commences at the end of the branch more or less in the vicinity of the mid-plane of the tee. The winding then extends helically along the branch with a small helix angle, across the diaphragm area on one side of the tee, around the back of the run, and helically across the opposite side of the tee to the opposite crotch. After passing through the crotch, the winding extends helically along the branch with a large helix angle to the end of the branch. In the schematic illustration of FIG. 12, the end point of this winding pattern at the end of the branch is about 90° counterclockwise from the starting point. This angle is appropriate for the schematic illustration but subject to appreciable variation due to differences in the length of the branch in various sizes of tees. Several such windings can be built up on the mandrel with the starting and ending points shifting clockwise and/or counterclockwise around the end of the branch to cover an extended area on the tee.

Pattern (i) has an interesting feature at the end of the branch. When a roving extends off the end of the branch as illustrated in FIG. 12, it then makes a partial turn around the nose 32 (FIG. 1) at the end of the branch on the mandrel. The roving can then come off the end of the branch on the opposite side of the tee in a repetition of Pattern (i), that is a mirror image of the pattern illustrated in FIG. 12. This builds up fibers in both crotches and on both sides of the tee in a logical and symmetrical sequence.

Another pattern suitable for winding a pipe tee with rovings, referred to herein as Pattern (j), is illustrated in FIG. 13. Two segments of such a pattern are illustrated in the drawing.

Pattern (j) commences at an end of the run on one side of the tee, extends in a helical path around the run through the nearer crotch, then helically around the branch to the end of the branch on the opposite side of the tee from the starting point. A return path of Pattern (j) starts at an end of the branch on the opposite side of the tee from the end of a preceding path, extends helically around the branch through the same crotch, then helically around the run to the end of the run on the opposite side from the start of a preceding path. When a pair of such winding patterns are started from similar points on opposite sides of the tee they cross in the mid-plane of the tee in the crotch. By starting and ending at differing locations around the ends of the run and branch, the locus of crossing can be varied along the mid-plane through the crotch and along the branch.

It is desirable to use Pattern (j) since this pattern provides fibers with a substantial longitudinally extending component in the crotch near the mid-plane of the tee. Other patterns can be used to provide such longitudinally extending fibers but a plurality of such patterns can be needed for adequately covering all portions of the crotch. These Patterns (i) and (j) place rovings with a substantial longitudinal component high in the crotch, that is, nearer the end of the branch. Rovings having a substantial component extending longitudinally along the run and lying lower in the crotch can be provided by Patterns (b) or (f), for example. If desired, Patterns (i) and (j) can be used in an embodiment employing both tape and rovings for winding a tee. It is preferred, however, to delete these patterns since each contributes heavily to waste of material upon end trimming and somewhat similarly oriented fibers can be readily applied by use of the above-described tape.

A preferred combination of winding patterns for forming a pipe tee using entirely rovings comprises at a minimum Patterns (c), (f), (i) and (j). Collectively, these patterns can be employed for providing reinforcing fibers with suitable orientations on all portions of the pipe tee. It is desirable, however, in such an embodiment to also include Patterns (a) and (b). This is desirable since some of the regions on the tee are more easily covered than with other windings, particularly in certain types of automatic winding machinery.

Another combination of patterns suitable for forming a pipe tee made solely with windings of rovings requires Patterns (f), (h) and (i), plus substantially circumferential windings around the bell step and bell at each end of the run and branch. Desirable patterns to include in such a combination are Patterns (a), (b) and (c). Patterns (b) and (c) can include a plurality of substantially circumferential windings around the ends of the run and branch.

Still another combination of patterns suitable for forming a pipe tee using only rovings requires Patterns (b), (c), and (i). In such an embodiment the starting point of Pattern (b) is moved around the end of the run so that in some wraps there is a large helix angle for covering all portions of the pipe tee with fibers having appropriate orientations for carrying the applied stresses. In order to minimize this requirement it is preferred to also include Pattern (f) in the windings. Additional patterns that can be included to make winding such a tee easier are Patterns (a) and (h) and circumferential windings around the bell and bell step at each end of the run and branch, particularly around the branch since Patterns (b) and (c) can include a plurality of circumferential windings around the ends of the run and branch.

It will be noted that Pattern (i) is important in each embodiment of pipe tee formed by winding only rovings. Shifting of Pattern (i) among various starting and stopping points at the end of the branch can easily cover much of the crotch and diaphragm areas with fibers suitably oriented for resisting applied stresses. Further, Pattern (i) is readily implemented on a machine for automatically winding pipe tees. Although a pipe tee can be wound with all rovings without using Pattern (i), such an embodiment requires substitution of several different patterns to assure coverage of all areas on the pipe tee.

Although described in limited embodiments, many modifications and variations will be apparent to one skilled in the art. Thus, for example, the embodiments have been described in the context of epoxy resin and glass fibers. Other fibers and synthetic plastic materials such as polyester resin can clearly be substituted. The pipe tee is described with a bell for receiving the spigot of a pipe. Alternatively, the tee can be formed without a bell or bell step, that is, with the run and branch extending essentially as a cylinder. Such an embodiment is used, for example, by machining the exterior of the ends of the run and branch for receiving a flange which is cemented in place, thereby producing a fiber reinforced plastic pipe tee for flange connections. Many other modifications and variations will be apparent to those skilled in the art and it is therefore to be understood that within the scope of the appended claims this invention can be practiced otherwise than as specifically described.

What is claimed is:

1. A fiber reinforced plastic pipe tee having a straight run and a side branch comprising:
   a plurality of laminations of essentially continuous reinforcing fiber roving bonded together by a synthetic resin, including at least some layers of tape having a weft of parallel reinforcing fibers and a warp of carrier fibers for maintaining the reinforcing fibers substantially parallel to each other, the reinforcing fibers having ends embedded beneath fiber rovings adjacent the outside surface of the tee.

2. A pipe tee as recited in claim 1 wherein a portion of such tape is wrapped through each crotch between the branch and run with the length of the tape extending in an approximately radial plane.

3. A pipe tee as recited in claim 1 wherein at least a portion of such tape is wrapped in a generally 8-shaped pattern extending through each crotch between the branch and run and crossing on the back of the run opposite the branch.

4. A pipe tee as recited in claim 1 wherein a portion of the reinforcing fibers of the weft of the tape are parallel to the mid-plane of the tee in the area of each crotch between the branch and run.

5. A pipe tee as recited in claim 1 wherein at least a portion of such tape is wrapped circumferentially around each end of the tee.

6. A pipe tee as recited in claim 3 wherein at least a portion of such tape is wrapped in a pattern extending from one crotch between the run and branch around the back of the run, through an odd number of one half turns around the branch to the starting crotch, and around the back of the run to the opposite crotch.

7. A pipe tee as recited in claim 1 wherein at least a portion of the reinforcing fibers in the weft of such tape adjacent such an end of the tee are parallel to the axis of the end of the tee.

8. A pipe tee as recited in claim 1 wherein at least a portion of the reinforcing fibers in the weft of the tape are parallel to the axis of the run along at least a portion of the length of the back of the run opposite the branch.

9. A pipe tee as recited in claim 1 wherein at least a portion of the reinforcing fibers in the weft of the tape in the diaphragm area on each side of the tee near the intersection of the run and branch lie approximately parallel to the axis of the branch.

10. A fiber reinforced plastic pipe tee having a straight run and a side branch comprising:

a laminated structural layer comprising a plurality of wraps of tape having a weft of reinforcing fibers and a warp of non-reinforcing carrier fibers, the reinforcing fibers having ends embedded in the layer, the layer being bonded by synthetic resin; and an outer laminated layer comprising a plurality of wraps of reinforcing fiber roving bonded with a synthetic resin.

11. A pipe tee as recited in claim 10 wherein the structural layer further comprises a plurality of wraps of reinforcing fiber roving interleaved with the tape.

12. A pipe tee as recited in claim 10 wherein a portion of such tape is wrapped through each crotch between the branch and run with the length of the tape extending in an approximately radial plane.

13. A pipe tee as recited in claim 10 wherein at least a portion of such tape is wrapped in an 8-shaped pattern extending through each crotch between the branch and run and crossing on the back of the run opposite the branch.

14. A pipe tee as recited in claim 10 wherein a portion of the reinforcing fibers of the weft of the tape are parallel to the mid-plane of the tee in the area of each crotch between the branch and run.

15. A pipe tee as recited in claim 10 wherein at least a portion of such tape is wrapped circumferentially around each end of the tee.

16. A pipe tee as recited in claim 13 wherein at least a portion of such tape is wrapped in a pattern extending from one crotch between the run and branch around the back of the run, through an odd number of one half turns around the branch to the starting crotch and around the back of the run to the opposite crotch.

17. A pipe tee as recited in claim 10 wherein at least a portion of the reinforcing fibers in the weft of such tape adjacent such an end of the tee are parallel to the axis of the end of the tee.

18. A pipe tee as recited in claim 10 wherein at least a portion of the reinforcing fibers in the weft of the tape are parallel to the axis of the run along at least a portion of the length of the back of the run opposite the branch.

19. A pipe tee as recited in claim 10 wherein at least a portion of the reinforcing fibers in the weft of the tape in the diaphragm area on each side of the tee near the intersection of the run and branch lie approximately parallel to the axis of the branch.

20. A pipe tee as recited in claim 10 further comprising an inner laminated layer comprising a plurality of wraps of reinforcing fiber roving bonded with a synthetic resin inside the structural layer.

21. A fiber reinforced plastic pipe tee having a straight run and a side branch, a pair of crotches between the branch and run and a diaphragm area on each side of the mid-plane of the tee near the intersection of the branch and run, comprising a plurality of wraps of reinforcing fiber rovings having the oattern (V) starting from a crotch, extending helically across one side of the tee and around the back of the run, then across the opposite side of the tee crossing the center plane of the branch and ending at the end of the branch; and further comprising a sufficient plurality of different optional wraps of reinforcing fiber rovings for covering the entire pipe tee selected from the groups of patterns consisting of:

(I) starting at one side of an end of the run, extending helically with a first hand around the back of the run, through the oppoist crotch, then helically with a second hand around the back of the run, and ending at the opposite side of the run at the same end;

(II) starting at one side of an end of the run, extending helically with a first hand around the back of the run, then through the opposite crotch, then circumferentially around the opposite end of the run at least one revolution back to the crotch, then helically with a second hand around the back of the run, and ending on the opposite side of the same end of the run;

(III) starting near the back of the run at one end, extending helically around the run across the diaphragm area, then through the opposite crotch, then circumferentially around the branch at least one half revolution, then through a crotch, then helically around the body of the tee across a diaphragm area, and ending near the back of the run at an opposite end;

(IV) starting at one end of the run extending helically around the run across a center portion of the back of the run and ending at the opposite end of the run;

(VI) a generally 8-shaped pattern starting in one crotch, extending helically with a first hand around the back of the run, then through the opposite crotch, then helically with a second hand around the back of the run, and ending in the starting crotch;

(VII) starting in one crotch, extending helically with a first hand around the back of the run, then through the opposite crotch, then at least one half turn around the branch to the starting crotch, then helically with a second hand around the back of the run and ending in the opposite crotch; and (VIII) interleavings of said patterns.

22. A pipe tee as recited in claim 21 comprising:
an inner layer comprising Patterns (I) through (V);
an intermediate layer comprising Patterns (I), (II), and (III), and Pattern (VI) or (VII); and
an outer layer comprising Patterns (I) through (V).

23. A pipe tee as recited in claim 22 wherein the intermediate layer comprises at least a portion of glass fibers in bundles having ends within the intermediate layer.

24. A pipe tee as recited in claim 21 further including a pattern starting on one side at an end of the run, extending helically with a first hand around the back and the opposite side of the run, then through the opposite crotch, then circumferentially around the opposite end of the run, then through the opposite crotch and helically with the second hand across the starting side of the run and circumferentially around the starting end of the run, then through the nearer crotch, then helically with the first hand around the back of the run, and ending at the opposite end of the run.

25. A fiber reinforced plastic pipe tee having a straight run and a side branch, a pair of crotches between the branch and run and a diaphragm area on each side of the mid-plane of the tee near the intersection of the branch and run comprising a plurality of wraps containing reinforcing fiber roving including at least some wraps of each of the following patterns:

(I) starting at one side of an end of the run extending helically with a first hand around the back of the run, through the opposite crotch, then helically with a second hand around the back of the run, and ending at the opposite side of the run at the same end;

(II) starting at one side of an end of the run, extending helically with a first hand around the back of the run, then through the opposite crotch, then circumferentially around the opposite end of the run at least one revolution back to the crotch, then helically with a second hand around the back of the run, and ending on the opposite side of the same end of the run;

(III) starting near the back of the run at one end, extending helically around the run across the diaphragm area, then through the opposite crotch, then circumferentially around the branch at least one-half revolution, then through a crotch, then helically around the body of the tee across a diaphragm area, and ending near the back of the run at an end;

(IV) starting at one end of the run extending helically around the run across a center portion of the back of the run and ending at the opposite end of the run;

(V) starting from a crotch, extending helically across one side of the tee and around the back of the run, then across the opposite side of the tee crossing the center plane of the branch and ending at the end of the branch; and (VI) a generally 8-shaped pattern starting in one crotch, extending helically with a first hand around the back of the run, the through the opposite crotch, then helically with a second hand around the back of the run, and ending in the starting crotch; or (VII) starting in one crotch, extending helically with a first hand around the back of the run, then through the opposite crotch, then at least one-half turn around the branck to the starting crotch, then helically with a second hand around the back of the run and ending in the opposite crotch.

26. A pipe tee as recited in claim 25 further including a pattern starting on one side at an end of the run, extending helically with a first hand around the back and the oppiste side of the run, then through the opposite crotch, then circumferentially around the opposite end of the run, then through the opposite crotch and helically with the second hand across the starting side of the run and circumferentially around the starting end of the run, then through the nearer crotch, then helically with the first hand around the back of the run, and ending at the opposite end of the run.

27. A pipe tee as recited in claim 25 comprising:
an inner layer comprising Patterns (I) through (V);
an intermediate layer comprising Patterns (I), (II), (III) and (VI) or (VII); and
an outer layer comprising Patterns (I) through (V).

28. A pipe tee as recited in claim 27 wherein the intermediate layer comprises at least a portion of glass fibers in bundles having ends within the intermediate layer.

29. A fiber reinforced plastic pipe tee having a straight run and a side branch, a pair of crotches between the branch and run and a diaphragm area on each side of the mid-plane of the tee near the intersection of the branch and run comprising a plurality of different wrap patterns of reinforcing fiber roving including at least some wraps of each pattern from the group consisting essentially of:

(I) starting at one side of an end of the run, extending helically with a first hand around the back of the run, through the opposite crotch, then helically with a second hand around the back of the run, and ending at the opposite side of the run at the same end;

(II) starting at one side of an end of the run, extending helically with a first hand around the back of the run, then through the opposite crotch, then circumferentially around the end of the run at least one revolution back to the crotch, then helically with a second hand around the back of the run, and ending on the opposite side of the same end of the run;

(III) starting on one side of the tee near the back of the run at one end, extending helically with a first hand around the run across the diaphragm area, then through the opposite crotch, then circumferentially around the branch a plurality of one-half revolutions relatively nearer the intersection of the run and branch, then through the nearer crotch, then helically with a second hand around the body of the tee across the same diaphragm area, and ending near the back of the run at the opposite end;

(IV) starting near the back of the run at one end extending helically with one hand arounddthe run across the diaphragm area, then through the opposite crotch, then circumferentially around the branch one-half revolution relatively nearer the end of the branch than pattern (III), then through the nearer crotch, then helically with a second hsnd around the body of the tee across the same diaphragm area and ending near the back of the run at the opposite end;

(V) starting on one side at an end of the run extending helically with a first hand around the back and the opposite side of the run, then through the opposite crotch, then circumferentially around the opposite end of the run, then through the opposite crotch and helically with the second hand across the starting side of the run and circumferentially around the starting end of the run, then through the nearer crotch, then helically with the first hand around the back of the run, and ending at the opposite end of the run;

(VI) starting at one end of the run extending helically around the run across a center portion of the back of the run and ending at the opposite end of the run;

(VII) starting from a crotch, extending helically across one side of the tee and around the back of the run, then across the opposite side of the tee crossing the center plane of the branch and ending at the end of the branch; and (VIII) a generally 8-shaped pattern starting in one crotch, extending helically with a first hand around the back of the run, then through the opposite crotch, then helically with a second hand around the back of the run, and ending in the starting crotch; or (IX) starting in one crotch, extending helically with a first hand around the back of the run, then through the opposite crotch, then at least one-half turn around the branch to the starting crotch , then helically with a second hand around the back of the run and ending in the opposite crotch.

30. A pipe tee as recited in claim: 28 further comprising at least some layers of tape having a weft of parallel reinforcing fibers having ends embedded beneath fiber rovings in other layers and a warp of non-reinforcing carrier fibers.

31. A fiber reinforced plastic pipe tee having a straight run and a side branch comprising a plurality of laminations of reinforcing fibers bonded together by synthetic resin including at least some layers of tape having a weft comprising a plurality of bundles of parallel reinforcing fibers and a carrier warp sufficiently loosely holding the bundles to permit skewing of the bundles relative to the length of the tape before curing the resin and at least some layers of essentially continuous reinforcing fiber rovings.

32. A pipe tee as recited in claim 31 wherein such layers of rovings are interleaved between such layers of tape.

33. A pipe tee as recited in claim 31 wherein the reinforcing fibers in the bundles have ends embedded beneath the outside surface of the tee.

34. A pipe tee as recited in claim 33 including an outermost layer consisting essentially of such essentially continuous reinforcing fiber rovings.

35. A pipe tee as recited in claim 31 wherein a portion of such tape is wrapped through each crotch between the branch and run with the length of the tape extending in an approximately radial plane.

36. A pipe tee as recited in claim 31 wherein at least a portion of such tape is wrapped in a generally 8-shaped pattern extending through each crotch between the branch and run and crossing on the back of the run opposite the branch.

37. A pipe tee as recited in claim 31 wherein a portion of the reinforcing fibers of the weft of the tape are parallel to the mid-plane of the tee in the area of each crotch between the branch and run.

38. A pipe tee as recited in claim 36, wherein at least a portion of such tape is wrapped in a pattern extending from one crotch between the run and branch around the back of the run, through an odd number of one-half turns around the branch to the starting crotch, and around the back of the run to the opposite crotch.

39. A pipe tee as recited in claim 31 wherein at least a portion of the reinforcing fibers in the weft of such tape adjacent such an end of the tee are parallel to the axis of the end of the tee.

40. A pipe tee as recited in claim 31 wherein at least a portion of the reinforcing fibers in the weft of the tape are parallel to the axis of the run along at least a portion of the length of the back of the run opposite the branch.

41. A pipe tee as recited in claim 31 wherein at least a portion of the reinforcing fibers in the weft of the tape in the diaphragm area on each side of the tee near the intersection of the run and branch lie approximately parallel to the axis of the branch.

42. A fiber reinforced plastic pipe tee having a straight run and a side branch comprising a plurality of layers of reinforcing fibers bonded together by synthetic resin comprising interleaving of a first plurality of layers of essentially continuous reinforcing fiber rovings and a second plurality of layers of bundles of parallel reinforcing fibers having ends embedded beneath the outside surface of the tee and extending transverse to such rovings.

43. A pipe tee as recited in claim 42 including an outermost layer consisting essentially of such essentially continuous reinforcing fiber rovings.

44. A pipe tee as recited in claim 42 wherein at least a portion of the bundles are parallel to the mid-plane of the tee in the area of each crotch between the branch and run.

45. A pipe tee as recited in claim 42 wherein at least a portion of the bundles adjacent an end of the tee are parallel to the axis of the end of the tee.

46. A pipe tee as recited in claim 42 wherein at least a portion of the bundles are parallel to the axis of the run along at least a portion of the length of the back of the run opposite the branch.

47. A pipe tee as recited in claim 42 wherein at least a portion of the bundles in the diaphragm area on each side of the tee near the intersection of the run and branch lie approximately parallel to the axis of the branch.

48. A fiber reinforced plastic pipe tee having a straight run and a side branch, a pair of crotches between the branch and run and a diaphragm area on each side of the mid-plane of the tee near the intersection of the branch and run, comprising at least some wraps of reinforcing fiber rovings from each of the group of patterns consisting of:
(I) starting near the back of the run at one end, extending helically around the run across the diaphragm area, then through the opposite crotch, then circumferentially around the branch at least one half revolution, then through a crotch, then helically around the body of the tee across a diaphragm area, and ending near the back of the run at an opposite end;
(II) starting at one end of the run extending helically around the run across a center portion of the back of the run and ending at the opposite end of the run;
(III) starting at the end of the branch, extending helically with a first hand at a relatively smaller helix angle along the branch, across the diaphragm area, then around the back of the run, then helically with a second hand across the opposite side of the run, then through the crotch opposite from the region of the start, then helically with the first hand at a relatively larger helix angle along the branch on the same side of the tee as the diaphragm area and ending at the end of the branch; and
(IV) starting at an end of the run, extending helically with a first hand along the run, then through the nearer crotch, then along the branch with the same hand, and ending at the end of the branch.

49. A pipe tee as recited in claim 48 further comprising at least some wraps from the following patterns:
(V) starting at one side of an end of the run extending helically with a first hand around the back of the run, through the opposite crotch, then helically with a second hand around the back of the run, and ending at the opposite side of the run at the same end; and
(VI) starting at one side of an end of the run, extending helically with a first hand around the back of the run, then through the opposite crotch, then circumferentially around the opposite end of the run at least one revolution back to the crotch, then helically with a second hand around the back of the run, and ending on the opposite side of the same end of the run.

50. A fiber reinforced plastic pipe tee having a straight run and a side branch, a pair of crotches between the branch and run and a diaphragm area on each side of the mid-plane of the tee near the intersection of the branch and run, comprising at least some wraps of reinforcing fiber rovings from each of the group of patterns consisting of:
(I) starting at one side of an end of the run, extending helically with a first hand around the back of the run, then through the opposite crotch, then circumferentially around the opposite end of the run at least one revolution back to the crotch, then helically with a second hand around the back of the run, and ending on the opposite side of the same end of the run;
(II) starting near the back of the run at one end, extending helically around the run across the diaphragm area, then through the opposite crotch, then circumferentially around the branch at least one half revolution, then through a crotch, then helically around the body of the tee across a diaphragm area, and ending near the back of the run at an opposite end;
(III) starting at the end of the branch, extending helically with a first hand at a relatively smaller helix angle along the branch, across the diaphragm area, then around the back of the run, then helically with a second hand across the opposite side of the run, then through the crotch opposite from the region of the start, then helically with the first hand at a relatively larger helix angle along the branch on the same side of the tee as the diaphragm area and ending at the end of the branch; and (IV) starting at one end of the run extending helically around the run across a center portion of the back of the run and ending at the opposite end of the run.

51. A pipe tee as recited in claim 50 further comprising at least some wraps from the patterns comprising:

(V) starting at one side of an end of the run, extending helically with a first hand around the back of the run, through the opposite crotch, then helically with a second hand around the back of the run, and ending at the opposite side of the run at the same end; and (VI) a generally 8-shaped pattern starting in one crotch, extending helically with a first hand around the back of the run, then through the opposite crotch, then helically with a second hand around the back of the run, and ending in the starting crotch; or (VII) starting in one crotch, extending helically with a first hand around the back of the run, then through the opposite crotch, then at least one half turn around the branch to the starting crotch, then helically with a second hand around the back of the run and ending in the opposite crotch.

52. A pipe tee as recited in claim 51 further comprising a plurality of substantially circumferentially extending wraps around each end of the run and branch.

53. A pipe tee as recited in claim 50 further comprising a plurality of substantially circumferentially extending wraps around each end of the run and branch.

* * * * *

UNITED STATES PATENT AND TRADEMARK OFFICE
CERTIFICATE OF CORRECTION

PATENT NO. : 4,601,496                              Page 1 of 2
DATED      : July 22, 1986
INVENTOR(S): Ronald G. Ulrich and Ralph S. Friedrich It is certified that error appears in the above-identified patent and that said Letters Patent are hereby corrected as shown below:

IN THE SPECIFICATION

Column 4, line 28, after "and" (second occurrence) delete the period.

Column 8, line 1, change "practial" to -- practical --.

Column 10, line 57, change "ellipitcal" to -- elliptical --.

Column 16, line 41, change "he" to -- the --.

Column 17, lines 4 and 5, change "cross overs" to -- crossovers --.

Column 17, lines 9 and 13, change "cross over" to -- crossover --.

Column 17, line 66, change "is" to -- are --.

Column 18, line 23, change "briding" to -- bridging --.

Column 20, line 8, change "trade offs" to -- trade-offs --.

UNITED STATES PATENT AND TRADEMARK OFFICE
CERTIFICATE OF CORRECTION

PATENT NO. : 4,601,496  
DATED : July 22, 1986  
INVENTOR(S) : Ronald G. Ulrich and Ralph S. Friedrich Page 2 of 2

It is certified that error appears in the above-identified patent and that said Letters Patent are hereby corrected as shown below:

IN THE CLAIMS

Column 23, line 57, change "oattern" to -- pattern --.
Column 23, line 64, change "groups" to -- group --.
Column 23, line 68, change "oppoiste" to -- opposite --.
Column 24, line 33, change "(V.)" to -- (IV) --.
Column 24, line 36, change "(V)" to -- (IV) --.
Column 25, line 20, before "through" change "the" to -- then --.
Column 25, line 26, change "branck" to -- branch --.
Column 26, line 12, change "aroundd" to -- around --.
Column 26, line 17, change "hsnd" to -- hand --.
Column 26, line 50, change "claim: 28" to -- claim 29 --.

Signed and Sealed this

Twenty-fourth Day of February, 1987

Attest:

DONALD J. QUIGG

Attesting Officer     Commissioner of Patents and Trademarks